July 8, 1958 G. C. KENT 2,842,333
VALVE
Filed Dec. 7, 1955 2 Sheets-Sheet 1

INVENTOR.
George C. Kent.
BY Nathan N. Kraus
Frank H. Marbo
Attys.

July 8, 1958  G. C. KENT  2,842,333
VALVE
Filed Dec. 7, 1955  2 Sheets-Sheet 2

INVENTOR.
George C. Kent.
BY Nathan H. Kraus
Frank H. Marks
ATTYS.

United States Patent Office

2,842,333
Patented July 8, 1958

2,842,333

VALVE

George C. Kent, Elmhurst, Ill., assignor, by mesne assignments, to Controls Company of America, Schiller Park, Ill., a corporation of Delaware Application December 7, 1955, Serial No. 551,601

1 Claim. (Cl. 251—88)

This invention relates to a valve and particularly to the valve member of a valve for handling fluids at relatively low pressure.

A valve member embodying the present invention is simple, reliable, economical to manufacture and assemble, and may be used on a wide variety of valves. The valve member embodying the present invention provides a relatively large surface for valve action, is constructed in such a manner that effective valve sealing is provided in the closed position of the valve, and has the desirable characteristic of being entirely free of internal leakage. The new valve member presents an unbroken sealing surface in the closed position of the valve so that there is no possibility of internal leakage in the absence of a break in the structure.

In order that the invention may be fully understood, reference will now be made to the drawing, wherein—

Figure 1:
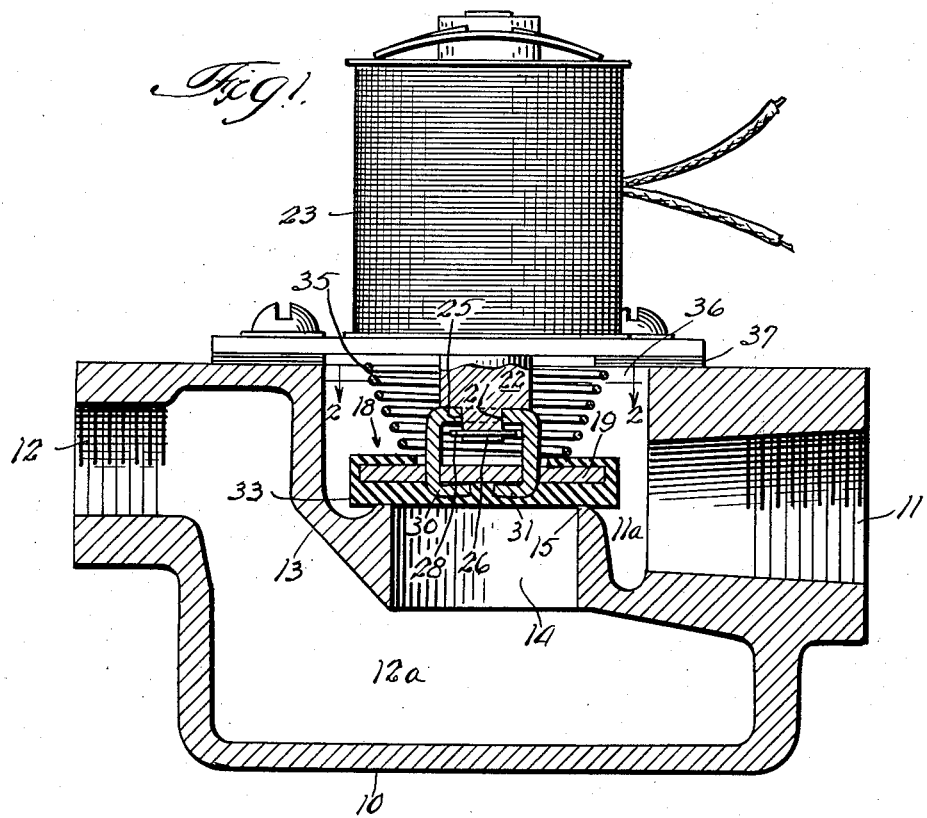
Fig. 1 is a sectional elevation of the valve embodying the present invention.
Figure 2:
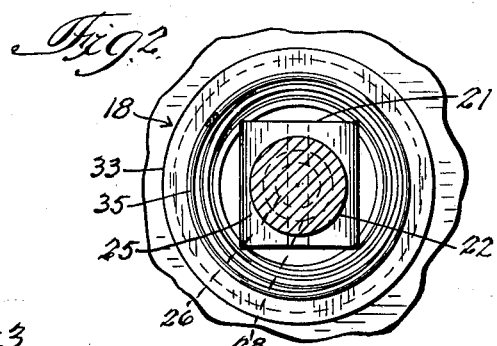
Fig. 2 is a section on line 2—2 of Fig. 1.
Figure 3:
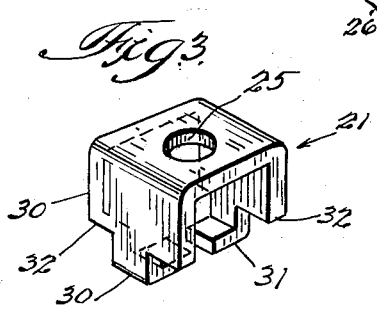
Fig. 3 is a perspective detail of the attaching member.

Referring first to Figs. 1 to 3, inclusive, the valve comprises body 10 having inlet and outlet channels 11 and 12, respectively. The valve body may be of any material such as, for example, aluminum, cast iron, brass, bronze or of any suitable plastic. Inlet and outlet channels 11 and 12 may be threaded to accommodate pipes or, if desired, these channels may be smooth to permit copper or brass tube to be sweated into position.

Valve body 10 has partition 13 dividing the valve chamber into high and low pressure regions 11a and 12a adjacent inlet 11 and outlet 12, respectively. Partition 13 has passage 14 therethrough, the partition passage being bounded by valve seat 15. Valve seat 15 is preferably finished smooth to provide a valve seat which is shown as annular but which may have any desired shape. If desired, a sleeve of suitable material such as rubber or plastic may be disposed over the flanged edge forming the valve seat to form an auxiliary valve seat of suitable material.

Cooperating with valve seat 15 is a movable valve member generally indicated by 18. Valve member 18 includes plate 19 of rigid material having sufficient mechanical strength, such as, for example, iron, steel, aluminum, brass or other suitable metal, plastic such as Bakelite, or other material having suitable properties for withstanding the effect of the fluid with which the valve operates. Plate 19 may be a circular disk but may have any desired shape. Plate 19 has its transverse dimension larger than that of valve seat 15. Plate or disk 19 is carried by attaching member 21 joining the plate to some operating member 22. Member 22 is here illustrated as being the plunger of a reciprocating means, such as solenoid 23. However, plunger 22 may be actuated by any other means or may even be manually operated. Plunger 22 may also be carried by an externally threaded rod operating in a fixed threaded sleeve, such as is common with conventional hand-operated faucets or other similar valves.

Attaching member 21 has portion 25 apertured to accommodate reduced portion 26 of plunger 22. A snap ring or C-washer 28 may be disposed over reduced portion 26, this portion having a suitable slot therein for accommodating the washer or ring. Any other means for locking the attaching member in position may be provided, such as, for example, by swaging or spreading the very end of reduced portion 26 to lock portion 25 in position. Portion 25 may have play axially of the plunger and may also be free to turn with respect to reduced portion 26. However, if desired, attaching member 21 may be rigidly attached to plunger 22 so that there is no play whatsoever between plunger 22 and attaching member 21. The construction illustrated, however, permitting both vertical and rotational relative movement, is preferred.

Attaching member 21 has terminal portions 30 and 31 passing through suitable apertures in plate 19. Preferably, attaching member 21 has shoulders 32 at the body thereof for cooperating with the top face of plate 19 for limiting the entry of terminal portions 30 and 31 into the apertures of plate 19. Terminal portions 30 and 31 are bent over or crimped along the bottom face of plate 19.

Plate 19 is provided with a sealing covering 33 of resilient material. This material may be of any suitable composition for withstanding the operating conditions. Thus coating 33 may be of rubber, either natural or synthetic, or a mixture of the two, or may be of any such material as nylon, Teflon, or the like. Covering 33 may be of rigid material such as molded plastic, in which case valve seat 15 should preferably have a resilient face. Covering 33 covers the bottom surface of plate 19 and preferably extends upwardly around the edge of plate 19 and extends inwardly for a distance around the top surface of plate 19. Covering 33 may be molded or may be formed over plate 19 by dipping or the like. Covering 33 may, however, be fabricated independently of plate 19 and thereafter stretched into position over the plate as illustrated. While covering 33 may be shaped to accommodate fastening member terminal portions 30 and 31, this is not essential and covering 33 may bulge downwardly over terminal portions 30 and 31.

Attaching member 21 is disposed generally axially of valve seat 15 and is sufficiently smaller than the valve seat diameter so that the maximum dimensions of attaching member 21 along the valve seat diameter are substantially smaller than the diameter of the valve seat itself. Accordingly, any bulging of covering 33 to clear terminal portions 30 and 31, or reduction in thickness of covering 33 to accommodate portions 30 and 31 will have no effect upon the cooperation of covering member 33 and valve seat 15.

The thickness of covering member 33 will vary depending upon the accuracy of finish of valve seat 15, the amount of pressure exerted by any spring means, such as, for example, 35, provided for biasing the valve to a closed position or maintaining the same in a closed position, the rapidity with which the valve member is closed down against its seat, and other considerations. Thus, if the valve member is apt to be closed quickly, covering member 33 may conveniently have substantial thickness to function not only as a sealing means for cooperation with valve seat 15, but also to provide shock-absorbing action. If the valve is to handle water or other essentially incompressible liquid, and if the sudden closure of the valve may result in hammer, then a substantial thickness of flexible covering 33 may be desirable for taking up the shock wave in the liquid. For most applications, resilient covering 33 may have substantial thickness such as of the order of about 3/32 of an inch, and may be cemented or molded upon plate 19 to provide a strong junction thereto.

The valve member and its operating mechanism, such as, for example, solenoid 23, may be rigidly bolted to body 10 at opening 36 in the body opposite valve seat 15. A tight seal for the valve member operating means may be provided by gasket 37. While the valve is illustrated as being biased to a closed position, it may be normally open or unbiased.

It is possible to have 11 and 12 as the discharge and intake openings, respectively, for the valve. In such case, the central under portion of covering 33 would be exposed to the high pressure. Irrespective of the direction of fluid flow through the valve body, internal leakage paths through the valve member will be eliminated. The pressure of fluid seeping below plate 19 tending to bulge flexible coating 33 downwardly away from the disk is negligible. In all cases, fluid flow through the valve is possible only when the valve member is clear of the valve seat. When the valve member is closed, as illustrated in the drawing, and assuming that the flexibility of covering 33 cooperates with finished valve seat surface 15 for thorough sealing, hermetic sealing of fluid is accomplished.

No attempt has been made to show relative proportions of the thicknesses of the various parts, and in particular the relative thicknesses of plate 19 and flexible coating 33. In some instances, flexible coating 33 may be quite thin, substantially thinner than plate 19. In other instances, flexible coating 33 may have a thickness of substantially the same order as plate 19. In other instances, flexible coating 33 may have a substantially greater thickness than plate 19. Thus, in the dimension previously given—3/32 of an inch for flexible coating 33—plate 19, if of steel or other metal, may have a thickness of the order of 1/32 of an inch or even less.

For certain purposes, such as in the handling of corrosive chemicals, flexible covering 33 may be of flexible nylon, while plate 19 may be of relatively rigid nylon. The fastening means 21 may be of any desired material, such as steel, covered with an impermeable coating of nylon or the like, while plunger 22 may be of relatively rigid nylon. Spring 35 may be of steel coated with nylon or rubber, or spring 35 may be of glass.

It will thus be clear than an economical and simple valve construction susceptible to a wide variety of applications has been provided.

Figure 4:
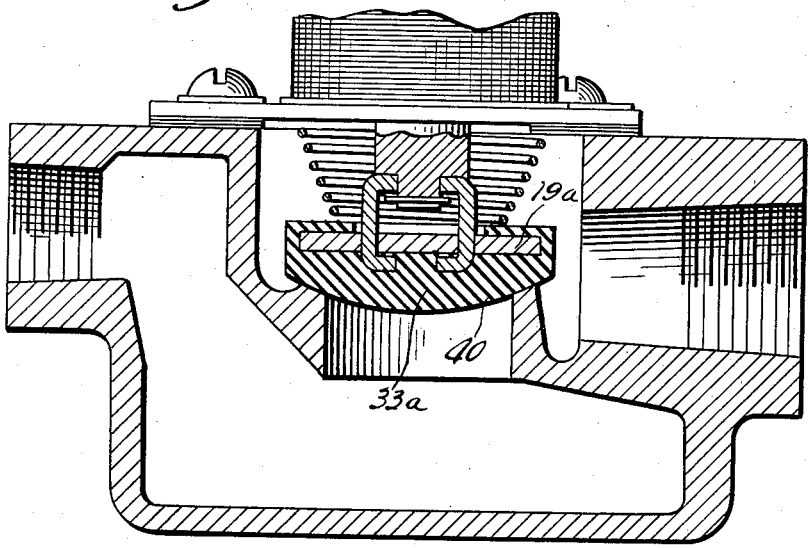
Figs. 4, 5 and 6 are, respectively, sectional elevations of modifications of the valve illustrated in Fig. 1.

Referring now to Fig. 4, the valve generally may have the same general construction as in Fig. 1, except that the valve member consists of flat plate member 19a having generally uniform thickness. Covering 33a is suitably attached to plate member 19a, said covering having a convex face 40 which is a surface of revolution and in its simplest form would be part of a spherical surface. Other surfaces of revolution may be used instead. It will be understood that the covering may include a convex face instead of the concave face 40.

Figure 5:
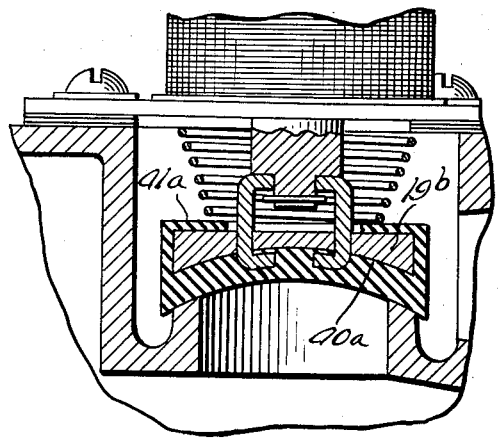
Figure 6:
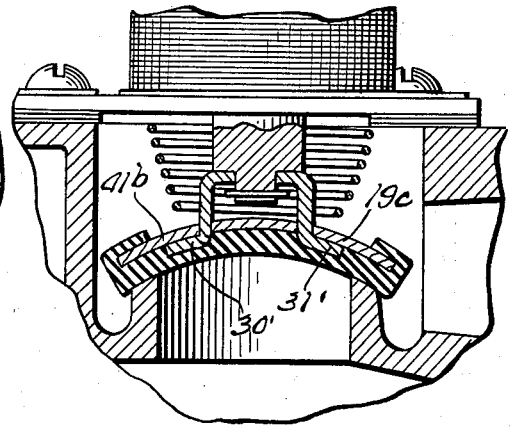

Referring to Fig. 5, plate 19b has concave bottom face 40a and flat top face 41a. In Fig. 6, plate 19c is dished so that the top face 41b is convex instead of flat, as in Fig. 5. Also in Fig. 6, fingers 30' and 31' are bent away from each other.

In all the forms of the invention, resilient covering corresponding to 33 in Fig. 1 may extend only to the edge of the supporting plate 19 and not necessarily extend around the edge to the rear face of the plate.

What is claimed is:

A valve comprising a valve body having an inlet and outlet separated by a partition provided with a valve seat, a valve member for cooperating with said valve seat, said valve member comprising a relatively rigid plate, a facing of compressible resilient material attached to said plate and cooperating with said valve seat for valve closing, a rodlike member for moving said valve member, an attaching member coupled to said rodlike member, said rodlike member having a reduced portion extending through an aperture in said attaching member and having means at the reduced portion thereof for locking said attaching member loosely to said reduced portion, said attaching member having terminal portions extending through slots in said plate and shoulders overlying the face of said plate, said terminal members being turned along the plate face to clamp said plate to said attaching member.

References Cited in the file of this patent

UNITED STATES PATENTS

| | | |
|---|---|---|
| 2,014,948 | McNeal | Sept. 17, 1935 |
| 2,075,761 | Jackman | Mar. 30, 1937 |
| 2,397,269 | Kelly | Mar. 26, 1946 |
| 2,441,252 | Sarver | May 11, 1948 |
| 2,693,199 | Sims | Nov. 2, 1954 |
| 2,730,326 | Staben | Jan. 10, 1956 |